(12) United States Patent
Hubauer et al.

(10) Patent No.: US 11,741,161 B2
(45) Date of Patent: Aug. 29, 2023

(54) SYSTEM AND METHOD FOR GENERATING A REFINED QUERY

(71) Applicant: Siemens Aktiengesellschaft, Munich (DE)

(72) Inventors: Thomas Hubauer, Garching bei München (DE); Swathi Shyam Sunder, Munich (DE); Janaki Joshi, Karnataka (IN)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 17/308,377

(22) Filed: May 5, 2021

(65) Prior Publication Data
US 2022/0358166 A1    Nov. 10, 2022

(51) Int. Cl.
*G06F 16/90* (2019.01)
*G06F 16/9032* (2019.01)
(Continued)

(52) U.S. Cl.
CPC .... *G06F 16/90324* (2019.01); *G06F 11/3409* (2013.01); *G06F 16/9027* (2019.01); *G06F 16/9035* (2019.01); *G06F 16/953* (2019.01)

(58) Field of Classification Search
CPC .......... G06F 16/90324; G06F 16/9027; G06F 16/9035; G06F 16/953
See application file for complete search history.

(56) References Cited

U.S. PATENT DOCUMENTS

| 10,176,245 | B2 | 1/2019 | Lim et al. | |
| 2017/0098009 | A1* | 4/2017 | Srinivasan | G06F 16/81 |
| 2021/0064620 | A1* | 3/2021 | Namaki | G06F 16/90324 |

OTHER PUBLICATIONS

"Syntax for Triple Patterns", https://www.w3.org/TR/sparql11-query/#QSynTriples.

* cited by examiner

Primary Examiner — Kristopher Andersen
(74) Attorney, Agent, or Firm — Schmeiser, Olsen & Watts LLP

(57) ABSTRACT

The disclosed relates to a system for generating a refined query, whereby the system comprises or is coupled with a search engine for searching through a tree of query modification operations, whereby the root node of said tree is an empty node which represents a given initial query, and comprises at least one processor which is configured to perform the following steps:
a) defining a set of query modification operators which can be inserted into said tree;
b) receiving a second set of reference query results;
c) receiving a first set of current query results from a currently given query comprising one or more triple patterns;
d) contrasting the first set of query results with the second set of query results by assessing the differences between the two query results;
e) running the search engine which is configured to perform the following steps:
f) selecting a node of said tree by a computed score derived from the assessed result;
g) selecting any query modification operator of the defined set of query modification operators;
h) if the selected query modification operator does not correspond to any of the triple patterns of the query represented by the selected node, then continue step f);
i) otherwise identifying at least one triple pattern of the query which the selected query modification operator corresponds to;
j) generating a refined query by applying the selected query modification operator to the identified triple pattern.

11 Claims, 2 Drawing Sheets

(51) Int. Cl.
*G06F 16/901* (2019.01)
*G06F 16/953* (2019.01)
*G06F 11/34* (2006.01)
*G06F 16/9035* (2019.01)
*G06F 16/20* (2019.01)
*G06F 11/30* (2006.01)

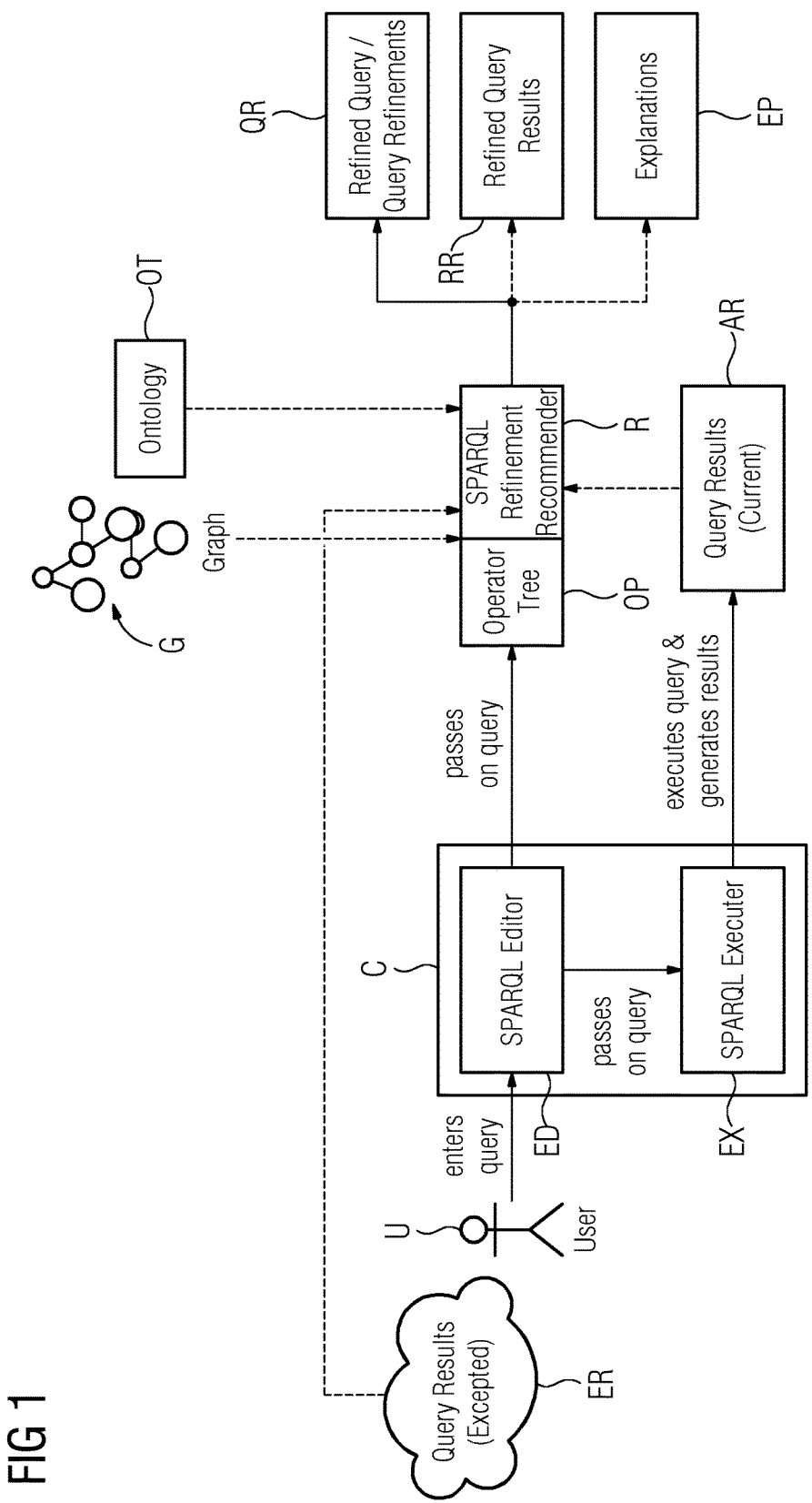

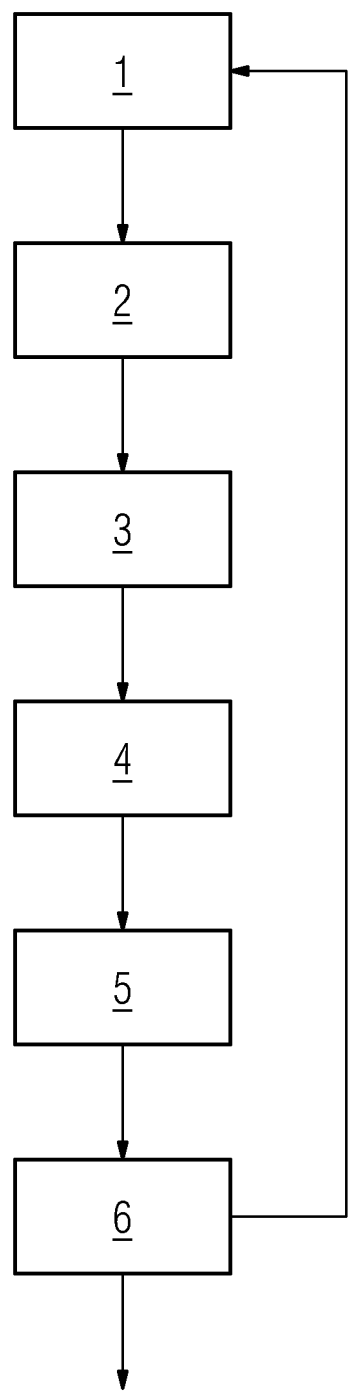

SYSTEM AND METHOD FOR GENERATING A REFINED QUERY

FIELD OF TECHNOLOGY

The present invention relates generally to computer database queries, and more specifically, to generating a refined query. Automatically generated recommendations can be used to refine the query.

BACKGROUND

A relational database organizes information using a relational model or schema to group data with common attributes into data sets. For example, a table of high-level student information may link to a table of addresses using identifier fields as keys to establish relationships between rows or tuples in each table. Thus, if multiple students share a common address, the common address need not be repeated multiple times in the table of high-level student information; rather, primary and foreign keys linking the tables can convey a many-to-one relationship between the multiple students and the common address.

An ontology is a formal representation of a set of concepts within a domain and the relationships between the concepts that may be used to reason about domain properties. An ontology associated with the information organized in a relational database is typically more complex than the structure of the relational database, as the ontology represents a graph structured model of knowledge that may be captured within the relational database.

In comparison to the relational database world, knowledge of the SPARQL query language is considerably less widespread. The SPARQL query language, standardized by the W3C (https://www.w3.org/TR/sparql11-query/#QSynTriples), is a query language used for RDF-based knowledge graphs and supported by all RDF triple stores. Tool support for writing such queries or another similar type of queries, which incorporate knowledge of a related ontology into said query, and even more debugging tools for such queries are scarce. This leads to situations where queries do not provide expected results, i.e. expected tuples (or facts) are missing from the answer set and/or the result set contains triples that are not part of the answer set intended by a user.

Besides, the SPARQL standard prescribes the capability to EXPLAIN a query (similar to the functionality offered by relational database systems). However, reading and understanding the query execution plan is complex even for skilled ontologists. Moreover, also the information reported there (e.g. expected tuple counts) are only indications of where a problem might lie, but do not guide the user to a solution.

In U.S. Pat. No. 10,176,245 B2 a method for producing semantic queries is known. This is a solution for debugging support of a SPARQL query which is completely constructed bases on examples using machine learning. The outcome is resulted from the applied query. There is no guidance, in particular for a user, to build and/or to improve the semantic query.

SUMMARY

It is therefore the object of the present invention to provide an improved system and/or method for support in fixing and/or refining a query.

The above-mentioned object is achieved by a method and one or more apparatus or a system, preferably a distributed system, according to the features of the independent claims. Preferred embodiments of the invention are described in the dependent claims. Any combination of the features of the dependent claims to each other and with the features of the independent claims is possible.

An aspect of the invention is a system, in particular an assistance system, for generating a refined, whereby the system comprises or is coupled with a search engine/unit for searching through a tree of query modification operations, whereby the root node of said tree is an empty node which represents a given initial query, and comprises at least one processor which is configured to perform the following steps:

a) defining a set of query modification operators which can be inserted into said tree;
b) receiving a second set of reference query results;
c) receiving a first set of (current) query results from a currently given query comprising one or more triple patterns; (preferably pre-defined by user interaction);
d) contrasting the first set of query results with the second set of query results by assessing the differences between the two query results;
e) initiating and/or running the search engine which is configured to perform the following steps:
f) selecting a node of said tree by a computed (heuristic) score derived from the assessed result;
g) selecting any query modification operator of the defined set of query modification operators;
h) if the selected query modification operator does not correspond to any of the triple patterns of the query represented by the selected node then continue step f);
i) otherwise identifying at least one triple pattern of the query which the selected query modification operator corresponds to;
j) generating a refined query by applying the selected query modification operator to the identified triple pattern.

The initial query is usually the first query without any modification which can be determined by a user or a bot via user interaction. A bot, derived from robot, is usually a software application that runs automated tasks (scripts) over the internet. They can also provide an automated script fetch, analyzes and files information from web servers.

The reference query results can be determined by selecting at least a subset of said first set or by sorting out at least a subset of said first set and/or by adding at least a set of missing query results into the first set.

The differences between the two query results can be assessed by counting the unwanted answers from the given query and missing answers from the given query. Depending on the focus to said answers the unwanted answers can be weighted more than the missing answers or vice versa. Other measures or scoring, in particular heuristic scoring functions, are possible.

Said tree should be expanded with a child node comprising the identified triple pattern including the selected query modification operator, whereby the child node represents the refined query.

The currently given query can be substituted with the refined query which can be re-executed. The steps c) to j) can be continued until no second set of query results is necessary and/or until no or few differences between the two query results are assessed and/or other user-defined/pre-defined criterion for termination is met. Few differences can be assessed by a threshold which is not to exceed by the counting result or score.

A triples pattern describes the syntax of a query which is described e.g. in the https://www.w3.org/TR/sparql11- query/#QSynTriples. The entire database is a set of "subject-predicate-object" triples. A query written e.g., in SPARQL provides specific graph traversal syntax for data that can be structured by a (knowledge) graph.

The at least one triple pattern of the query which the selected query modification operator corresponds to normally depends on the type of the operator. The query modification operators can weaken or strengthen entity classes and/or class properties of the query (both are class-oriented type of operators) or remove triple patterns and/or filter statements from the query or insert triple pattern and/or filter statements into the query. The Removing type of operator or inserting type of operator can be related to the complete or at least one part of the triple pattern.

The search engine or the search unit can be a software and/or hardware and/or firmware module which can be integrated or coupled with the system. The system initiates or runs it. The search engine is configured to perform the above-mentioned steps f) to j).

The least one processor can be further configured to output, by accessing an output device, the generated refined query.

According to an embodiment of the invention the search engine can be coupled with and/or interacts with a machine learning model which is configured to learn from the currently given query, from the first set of query results, from the second set of query results as well as from the assessed differences between these two query results, from the selected node and from the selected query modification operator in order to generate a refined query.

The machine learning model can use a Graph Neural Network (GNN), a type of Neural Network which directly operates on the Graph structure.

The invention provides an interactive mechanism to support users in refining their queries based on examples provided by rejecting answers from the (first set of) query results and/or specifying missing answers but expected results.

The invention can also propose modifications to the query, thereby providing a more directed approach to fix the query and at the same time allowing the user to improve their query writing skills. The inventive system and/or method refines (stepwise) an initial query, preferably provided by a user, whereby it makes use of the user's knowledge and experience to guide a search to a partial solution which should be improved instead of having to explore the complete search space, which is takes time and consumes cost. A combination of a heuristic rule-based approach for bootstrapping with a (one-shot or sequential) machine learning (ML) model is possible. This allows the ML model to learn from the interaction of the user with the system, reducing the required amount of training data. The inventive system and/or method aims to refine a query step by step with effects of each modification shown clearly to the user or returned as a feedback loop for the ML model. Even non-experts are guided to adapt such queries to get expected results because small steps of modifications are less complex to understand and control.

A further aspect of the invention is a method for generating a refined query, wherein a search engine/unit for searching through a tree of query modification operations is used, whereby the root node of said tree is an empty node which represents a given initial query, comprising the following steps:

a) defining a set of query modification operators which can be inserted into said tree;
b) receiving a second set of reference query results;
c) receiving a first set of current query results from a currently given query comprising one or more triple patterns;
d) contrasting the first set of query results with the second set of query results by assessing the differences between the two query results;
e) initiating/running the search engine which performs the following steps:
f) selecting a node of said tree by a computed score derived from the assessed result;
g) selecting any query modification operator of the defined set of query modification operators;
h) if the selected query modification operator does not correspond to any of the triple patterns of the query represented by the selected node then continue step f);
i) otherwise identifying at least one triple pattern of the query which the selected query modification operator corresponds to;
j) generating a refined query by applying the selected query modification operator to the identified triple pattern.

Embodiments as described above for the system can be analogous applied for the method and for computer program (product) and for the computer-readable storage medium.

This system which can be implemented by hardware, firmware and/or software or a combination of them.

The computer-readable storage medium stores instructions executable by one or more processors of a computer, wherein execution of the instructions causes the computer system to perform the method.

The computer program (product) is executed by one or more processors of a computer and performs the method.

BRIEF DESCRIPTION

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following figures:

FIG. 1 depicts a schematic overview over the inventive workflow for producing a refined query; and FIG. 2 depicts a method of an embodiment of the invention.

DETAILED DESCRIPTION

The actual query results AR, called first set of query results, from a currently given query, which could be predefined by user U and has been executed by an executer unit EX, are displayed to the user and contrasted with a set of expected reference query results ER (second set of reference query results), which can be selected from the first set of query results. In order to keep this expected query set ER manageable, there is no need to provide the full set of expected query results as one input. Instead, the user can mark answers or results respectively from the current query result set as "unwanted" (which means they are not part of the expected query result set) in an Editor ED within a computing system C, or manually provide additional expected answers (which means they are not part of the current query result set). Answers from the current query result set which have not been marked as "unwanted" are considered to be expected reference query results. The computing system C can distinguish between explicitly asserted expected answers and/or marked "unwanted" answers, and "assumed expected" answers on which the user has not given feedback. A heuristic scoring function can be used, which punish such "assumed expected answers" in contrast to explicitly asserted expected and unwanted answers. The result of the scoring function can be displayed for user decision. A not shown search engine for searching from a first node (the root node of said tree is an empty node which represents a given initial query) to a subsequent node through a query modification operator tree G could be used. If the (query modification) operator of a selected node belongs to any one to pre-determined operator types (which are explained below in more detail), then the operator is to apply to the triple pattern of the currently given query. A query recommender component R can be used in order to present recommendation for a refined query QR based on the applied operator. The recommendation can be generated automatically by the recommender component R or manually by the user U. The currently given query is re-executed by applying the recommendation including the selected operator, i.e. the currently given query is substituted with the refined query which is re-executed. The refined query results RR are displayed on a not shown output device. Additionally, explanations EP for the refined query can be provided which can be partly derived from an ontology OT of which the query structure is at the basis.

It is possible to introduce a not shown machine learning (ML) model which interacts with the search engine. The ML model can use a Graph Neural Network (GNN), a type of Neural Network which directly operates on the Graph G structure.

Termination of the workflow is met if no second set of query results is necessary and/or if no or few differences between the two query results are assessed and/or if another user-defined/pre-defined criterion for termination is fulfilled.

Query refinement can be based on the following set of query modification operators (queries are usually "FILTER-normalized", i.e. FILTER statement with multiple criteria combined conjunctively are broken down into multiple FILTER statements (one for each conjunct)):

1. Class weakening/strengthening: Replace the type t in a triple pattern ?var rdf: type t by a super-type of t (weakening) or a sub-type of t (strengthening). Information on the type hierarchy is taken from the ontology OT.
2. Property weakening/strengthening: Replace the property p in a triple pattern ?sub p ?obj by a super-property of p (weakening) or sub-property of p (strengthening). Information on the property hierarchy is taken from the ontology OT.
3. OPTIONAL insertion/removal/merge: Make a triple pattern OPTIONAL (insertion), remove the OPTIONAL around a triple pattern (removal), or merge two OPTIONAL statements into one (merge),
4. FILTER removal: Delete a FILTER statement from the query body. FILTER insertion is possible, but currently not supported due to search complexity.
5. Triple pattern insertion/removal: Completely remove a triple pattern from the query body (removal), or introduce a new triple pattern (insertion). When a new pattern is introduced, all variables it contains must match variables of the same type being already present in the query body (wherein variable types distinguish variables representing properties from variables representing objects or literals). Triple patterns are created only over the vocabulary (properties, types, literals) already contained in the ontology. If an ontology is given, triple pattern generation is restricted to triple patterns that adhere to constraints formulated in the ontology, such as domain/range constraints, cardinality restrictions and such.

The query modification operators class weakening, property weakening, OPTIONAL insertion, FILTER removal and triple pattern removal are seen as weakening operators. All other operators are subsumed as strengthening operators.

In order to refine a given query based on the differences between expected (second set) and current query results (first set), a classic search approach is use. It maintains a search tree of query modification operators (corresponding to a tree of resulting updated queries). The tree can be explored in a heuristic fashion, wherein in the beginning the tree only consists of the initial query. That means the root node is and empty node which contains an empty operator list. A search engine can run the following search process which is depict in FIG. 2 via a flow chart.

1) Select a node of the operator tree. Node selection is done based on a heuristic score s which is computed as a weighted sum of the number of applied operators (denoted by o), the number of unwanted query results contained in the answer set of the current query corresponding to the node (denoted by u), and the number of missing results in the answer set (denoted by m) which represent differences between the answer set and reference set which conceptually includes the missing results and does not contain the unwanted results. A simple example would be a weighted sum score(node) =$\alpha$*u+$\beta$*m+(1-$\alpha$-$\beta$)*o, where nodes with a lower score are preferred. Other scoring functions can be used.

2) Based on the current node (=query), one of the existing operators is selected. Operator choice can be done at random, or by applying heuristics such as the following ones:

Only applicable operators are selected (i.e. no FILTER removal operator is chosen if the query does not contain a FILTER statement)

None of the operators is selected that inverts already applied operators as recorded in the node (e.g. if ?var rdf:type t has been weakened to ?var rdf:type t2 before, do not strengthen it to ?var rdf:type t in the following in order to avoid loops. It's however admissible to strengthen it to ?var rdf:type t3 if t3 is also a sub-type of t2.

As long as unwanted results are contained in the result set, prefer strengthening operators over weakening operators. The goal is to reduce the answer set and computing time.

Making triple patterns OPTIONAL is preferred over removing them. The goal is to remain close to the original query.

3) If the selected operator is of the above-mentioned type 1 through 4, select the corresponding triple pattern to apply the operator to (normally one pattern, except for OPTIONAL merge). This choice can be done at random (among all triple patterns where the operator is applicable). However, the location can also be chosen heuristically (e.g. based on which location an operator has been applied the fewest time). To avoid cycles, any reasonable heuristic forbids choosing an element of the triple pattern that leads to a (operator, element) combination already contained in any of the children nodes.

4) Optionally re-execute the query

5) Compute the difference between the result of the modified query, and the expected answer set (second reference set). Add a node to the tree that tracks all operators applied to. In the case that the query cannot be computed successfully (e.g. because a variable used in result creation was removed from the query body), add an error node into the tree.

6) If the new answer set does no longer contain unwanted results and does contain all wanted results, return it by assessing an output device. A user can give feedback by user interaction. Otherwise, continue with step 1 unless a user-specified or otherwise pre-determined termination criterion (e.g. search depth) is met.

The above-explained and in FIG. 2 shown method is described without exception handling. The not shown exception handling could be:

There may be no viable query elements left in step 3. In this case, backtrack to step 2, mark the chosen operator as invalid for this node, and continue operator selection with valid operators only.

There may be no viable operators left in in step 2. In this case, mark the node as closed and backtrack to step 1, selecting among open nodes only.

Query execution may fail in step 4, for instance because a triple pattern removal removed a variable required for result construction (binding). In this case, add a child node with the additional (operator, element) combination, mark it as closed, and continue with step 1.

Depending on memory availability, the tree can be stored completely (sound & complete search). Alternatively, a threshold can be set in order to only keep the n highest-scoring nodes in the spirit of a beam search. In this case, however, search will be sound but not be complete.

The returned answer set on an output device can be presented to a user. It can be highlighted where the result set of the refined query differs from the result set of the original or initial one. The user can then decide to accept the modified parts of the query. This terminates the search process.

If the user is not yet satisfied with the result, they can mark additional unwanted results, and/or list additional missing results. It is also possible for the user to reject a modified query proposal without updating the information in the expected result set. In all rejection cases, the node corresponding to the query is marked as closed and search starts again with step 1. Optionally, when rejecting the modified query proposal, the user can also select element(s) of the query (triple pattern, FILTER statement, etc) that he or she disapproves of. In this case, the search is also restarted at step 1, however a focus is set in steps 3 and 4 on the selected query element that operators applicable to.

An ontology, structured by a knowledge graph (both T-box and A-box), can be equivalently represented as a tensor by "stacking" the incidence matrices of each relation on top of each other into a 3D-object. Moreover, SPARQL queries can also be interpreted as graphs and are therefore subject to the same approach. Using so-called embeddings, lower-order representations as feature vectors can be derived. This makes it possible to use both a knowledge graph as well as a query as features for machine learning.

The search process can be guided by a machine learning model that learns to generate a refined query, given the original query, the underlying knowledge graph, the current (first set) as well as the expected answer set (second set). This learning model can be designed in two ways:

Assumed the amount of training data is sufficiently large, an end-to-end model is used that directly determines the refined query. While this approach does not require any data besides the artifacts listed above.

It is therefore preferred to train sequentially a recommender component R which proposes query updates step by step. The required training data may come directly from the search process executed by the search engine described above and from the interaction of the user with the returned results. The search process can therefore be seen as a method to bootstrap the ML-based approach. Whenever the ML-based solution provides candidate results with sufficient quality (threshold based on likelihood of user acceptance), the ML solution can be presented to the user along with the others. Given sufficiently consistent answers by the user, the ML model learns a) relevant parts of the way how query evaluation works to propose reasonable modification steps and
b) which types of modifications is preferred by the user and lead to accepted sequences of query modifications and, ultimately, an accepted refined query.

The machine learning model can use a Graph Neural Network (GNN), a type of Neural Network which directly operates on the Graph structure.

The method can be executed by at least one processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the system and/or computer and/or another processor may be configured to implement the acts described herein.

The above-described method may be implemented via a computer program (product) including one or more computer-readable storage media having stored thereon instructions executable by one or more processors of a computing system and/or computing engine. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

The invention has been described in detail with reference to embodiments thereof and examples. Variations and modifications may, however, be effected within the spirit and scope of the invention covered by the claims. The phrase "at least one of A, B and C" as an alternative expression may provide that one or more of A, B and C may be used.

The terminology used herein is for the purpose of describing particular embodiments only and is not intended to be limiting of example embodiments of the invention. As used herein, the singular forms "a", "an", and "the" are intended to include the plural form as well, unless the context clearly indicates otherwise.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

None of the elements recited in the claims are intended to be a means-plus-function element unless an element is expressly recited using the phrase "means for" or, in the case of a method claim, using the phrases "operation for" or "step for".

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A system for automatically generating a refined query for a currently given query, wherein the system comprises at least one processor and further comprises a search engine for searching through a tree of query modification operations, wherein a root node of said tree is an empty node which represents a given initial query,
wherein the at least one processor is configured to perform the following steps:
a) defining a set of query modification operators which can be inserted into said tree;
b) receiving a first set of current query results from a currently given query comprising one or more triple patterns;
c) receiving a second set of reference query results, wherein the second set of reference query results are determined by user selection of at least a subset of the first set of current query results and/or addition of at least a set of missing query results into the first set of current query results;
d) contrasting the first set of current query results with the second set of reference query results by assessing differences between the first set of current query results and the second set of reference query results, wherein assessing differences includes deriving a computed score including a number of unwanted answers and a number of missing answers; and
wherein the search engine is configured to perform the following steps:
e) selecting a node of said tree by the computed score derived from the assessed differences;
f) selecting any query modification operator of the defined set of query modification operators;
g) if the selected query modification operator does not correspond to any triple patter of the query represented by the selected node, then returning to step e), otherwise continuing to step h;
h) identifying at least one triple pattern of the query which the selected query modification operator corresponds to; and
i) automatically generating the refined query by applying the selected query modification operator to the identified at least one triple pattern;
wherein the search engine interacts with a machine learning model that learns from the currently given query, from the first set of current query results, from the second set of reference query results as well as from the assessed differences between these two query results, from the selected node and from the selected query modification operator in order to automatically generate the refined query.

2. The system according to claim 1, wherein said tree is expanded with a child node comprising the identified at least one triple pattern including the selected query modification operator, wherein the child node represents the refined query.

3. The system according to claim 1, wherein
the currently given query is substituted with the refined query which is re-executed and steps c) to i) are continued until no further second set of query results is necessary, until no or few differences between the two query results are assessed, and/or until other user-defined/pre-defined criterion for termination is met.

4. The system according to claim 1, wherein the query modification operators can weaken or strengthen entity classes and/or class properties of the currently given query; remove triple patterns and/or filter statements from the currently given query; or insert triple patterns and/or filter statements into the currently given query.

5. The system according to claim 1, wherein the at least one processor is further configured to output, by accessing an output device, the generated refined query.

6. A method for automatically generating a refined query for a currently given query, wherein a search engine/unit for searching through a tree of query modification operations is used, wherein a root node of said tree is an empty node which representsa given initial query, comprisingthe following steps:
a) defining a set of query modification operators which can be inserted into said tree;
b) receiving a first set of current query results from a currently given query comprising one or more triple patterns;
c) receiving a second set of reference query results, wherein the second set of reference query results are determined by user selection of at least a subset of the first set of current query results and/or addition of at least a set of missing query results into the first set of current query results;
d) contrasting the first set of current query results with the second set of reference query results by assessing differences between the first set of current query results and the second set of reference query results, wherein assessing differences includes deriving a computed score including a number of unwanted answers and a number of missing answers;
e) initiating/running the search engine/unit which performs the following steps:
f) selecting a node of said tree by the computed score derived from the assessed differences;
g) selecting any query modification operator of the defined set of query modification operators;
h) if the selected query modification operator does not correspond to any triple pattern of the query represented by the selected node, then returningto step f) otherwise continuing to step i);
i) otherwise identifying at least one triple pattern of the query which the selected query modification operator corresponds to; and
j) automatically generating the refined query by applying the selected query modification operator to the identified at least one triple pattern;

wherein the search engine/unit interacts with a machine learning model that learns from the currently given query, from the first set of current query results, from the second set of reference query results as well as from the assessed differences between these two query results, from the selected node and from the selected query modification operator in order to automatically generate the refined query.

7. The method according to claim 6, wherein said tree is expanded with a child node comprising the identified at least one triple pattern including the selected query modification operator, wherein the child node represents the refined query.

8. The method according to claim 6, wherein
the currently given query is substituted with the refined query which is re-executed and step c) to j) are continued until no further second set of reference query results is necessary, until no or few differences between the two query results are assessed, and/or until other user-defined/pre-defined criterion for termination is met.

9. The method according to claim 6, wherein the query modification operators can weaken or strengthen entity classes and/or class properties of the currently given query; remove triple patterns and/or filter statements from the currently given query; or insert triple pattern and/or filter statements into the currently given query.

10. The method according to claim 6, further comprising: outputting the generated refined query.

11. A non-transitory computer-readable storage media comprising a computer program that, when executed by one or more processors of a computer, performs a method for automatically generating a refined query for a currently given query, wherein a search engine/unit for searching through a tree of query modification operations is used, wherein a root node of said tree is an empty node which represents a given initial query, wherein the method includes:
a) defining a set of query modification operators which can be inserted into said tree;
b) receiving a first set of current query results from a currently given query comprising one or more triple patterns;
c) receiving a second set of reference query results, wherein the second set of reference query results are determined by user selection of at least a subset of the first set of current query results and/or addition of at least a set of missing query results into the first set of current query results;
d) contrasting the first set of current query results with the second set of reference query results by assessing differences between the first set of current query results and the second set of reference query results, wherein assessing differences includes deriving a computed score including a number of unwanted answers and a number of missing answers;
e) initiating/running the search engine/unit which performs the following steps:
f) selecting a node of said tree by the computed score derived from the assessed differences;
g) selecting any query modification operator of the defined set of query modification operators;
h) if the selected query modification operator does not correspond to any triple pattern of the query represented by the selected node, then returning to step f) otherwise continuing to step i);
i) otherwise identifying at least one triple pattern of the query which the selected query modification operator corresponds to; and
j) automatically generating the refined query by applying the selected query modification operator to the identified at least one triple pattern;
wherein the search engine/unit interacts with a machine learning model that learns from the currently given query, from the first set of current query results, from the second set of reference query results as well as from the assessed differences between these two query results, from the selected node and from the selected query modification operator in order to automatically generate the refined query.

* * * * *